G. BREAULT.
NUT LOCK.
APPLICATION FILED MAR. 12, 1914.

1,111,732.

Patented Sept. 29, 1914.

WITNESSES

INVENTOR
GÉDÉON BREAULT,
BY Munn & Co.
ATTORNEYS

UNITED STATES PATENT OFFICE.

GÉDÉON BREAULT, OF PAWTUCKET, RHODE ISLAND.

NUT-LOCK.

1,111,732.  Specification of Letters Patent.  Patented Sept. 29, 1914.

Application filed March 12, 1914. Serial No. 824,118.

*To all whom it may concern:*

Be it known that I, GÉDÉON BREAULT, a citizen of Canada, and a resident of Pawtucket, in the county of Providence and State of Rhode Island, have made an Improvement in Nut-Locks, of which the following is a specification.

My invention is embodied in the construction and combination of parts hereinafter described, and illustrated in the accompanying drawing, in which—

Figure 1:
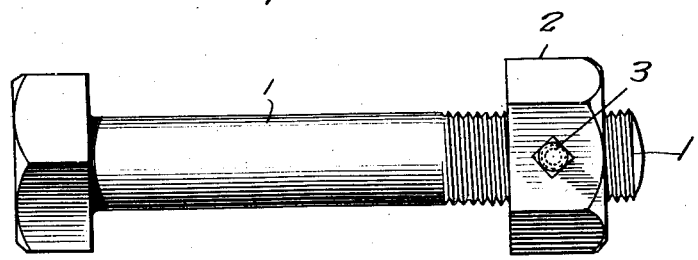
Figure 2:
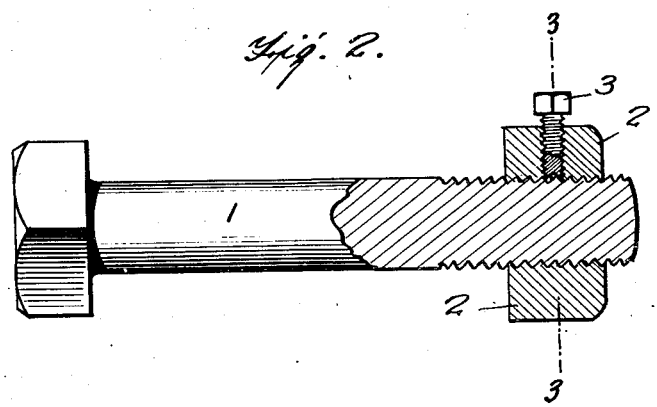
Figure 3:
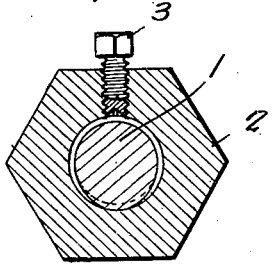
Figure 5:
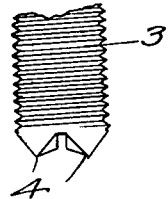

Figure 1 is a plan view of a bolt and nut provided with a locking-screw, according to my invention; Fig. 2 is a sectional view of the same parts; Fig. 3 is a cross section on the line 3—3 of Fig. 2; Fig. 4 is an end view of the locking screw; and Fig. 5 is a side view of a portion of the locking screw.

In the views 1, 2, 3, the numeral 1 indicates a screw-threaded bolt, 2 a polygonal nut, and 3 a locking screw. The nut has the usual, well known, hexagonal form and has a radially threaded bore formed in one of its sides in which the screw 3 is adapted to work. The screw has a polygonal head and its point is provided with cross-wise grooves, the same being arranged at right angles to each other, as will be understood by reference to Fig. 4. Instead of a polygonal head, the screw may have a round head, provided with a nick for receiving a screw-driver.

It is apparent that when the screw is inserted, as shown in Figs. 2 and 3, the four points 4, formed by the intersecting grooves, take into the grooves of the screw-thread formed in the bolt; or, in other words, the points straddle the spiral rib forming the thread of the bolt and thus makes a locking engagement which effectively prevents rotation of the nut on the bolt.

By the above described construction and combination of parts I form a lock-nut distinguished by simplicity and cheapness of construction and effectiveness in operation.

What I claim is:—

The combination with a threaded bolt, a polygonal nut applied thereto and provided at one of its sides with a radially threaded bore, of a locking screw inserted in such bore and having its inner end provided with cross-wise grooves arranged at an angle to each other and forming four points that take into the adjacent grooves of the bolt and straddle the thread between said grooves, as described.

GÉDÉON BREAULT.

Witnesses:
SIMON FARLEY,
J. CALIXTE PALIN.